(12) United States Patent
Childs

(10) Patent No.: US 12,475,198 B2
(45) Date of Patent: Nov. 18, 2025

(54) CONTEXTUALIZED CONTENT IDENTIFICATION

(71) Applicant: Sony Interactive Entertainment Europe Limited, London (GB)

(72) Inventor: Codie Marie Childs, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 0 days.

(21) Appl. No.: 18/380,721

(22) Filed: Oct. 17, 2023

(65) Prior Publication Data

US 2024/0152582 A1 May 9, 2024

(30) Foreign Application Priority Data

Nov. 4, 2022 (GB) ...................................... 2216479

(51) Int. Cl.
*G06F 21/10* (2013.01)

(52) U.S. Cl.
CPC .................................. *G06F 21/107* (2023.08)

(58) Field of Classification Search
CPC .... G06F 21/107; G06F 21/106; G06F 21/121; G06F 21/1078; G06F 21/16; G06F 21/10
See application file for complete search history.

(56) References Cited

U.S. PATENT DOCUMENTS

| | | | | |
|---|---|---|---|---|
| 6,732,180 B1 * | 5/2004 | Hale | ....................... | H04L 63/10 707/999.009 |
| 6,922,693 B1 * | 7/2005 | Rubin | ................... | G06Q 20/102 |
| 7,281,272 B1 * | 10/2007 | Rubin | ..................... | H04L 67/02 713/153 |
| 7,752,138 B1 * | 7/2010 | Dean | ..................... | G06Q 20/382 705/64 |
| 7,805,051 B2 * | 9/2010 | Bilbrey | .................. | H04N 5/765 386/241 |
| 7,805,616 B1 * | 9/2010 | Mohammed | .......... | H04L 9/3242 713/189 |
| 8,175,413 B1 * | 5/2012 | Ioffe | ..................... | G06V 10/10 382/283 |
| 8,402,283 B1 * | 3/2013 | Diamond | ................ | G06F 21/10 713/192 |
| 8,429,081 B1 * | 4/2013 | Dronamraju | ............ | G06F 21/10 705/902 |
| 8,498,982 B1 * | 7/2013 | Cope | ........................ | G06F 21/16 707/694 |
| 8,660,961 B2 * | 2/2014 | Raley | ................... | H04L 63/0861 705/51 |
| 8,726,400 B1 * | 5/2014 | Granstrom | ......... | H04N 21/2187 713/176 |
| 9,100,245 B1 * | 8/2015 | Andrews | ................ | H04L 63/123 |

(Continued)

OTHER PUBLICATIONS

Combined Search and Examination Report for British Application No. GB2216479.2 dated Jul. 10, 2023, pp. 1-9.

*Primary Examiner* — Aravind K Moorthy
(74) *Attorney, Agent, or Firm* — Fish & Richardson P.C.

(57) ABSTRACT

A computer-implemented method for identifying proprietary content in composite media comprising a plurality of media components, the method comprising: identifying a first media component of the composite media as proprietary content; identifying a second media component of the composite media as a context indicator; and determining a context for the proprietary content based on the context indicator.

15 Claims, 5 Drawing Sheets

(56) References Cited

U.S. PATENT DOCUMENTS

| | | | |
|---|---|---|---|
| 9,633,228 B1* | 4/2017 | Maimon | G06F 21/645 |
| 9,836,730 B1* | 12/2017 | Metrailler | G06Q 20/1235 |
| 10,049,190 B1* | 8/2018 | Newstadt | G06F 21/10 |
| 10,511,648 B1* | 12/2019 | Belikovetsky | H04L 65/70 |
| 11,178,447 B1* | 11/2021 | Panter | H04N 21/42203 |
| 11,212,595 B1* | 12/2021 | Ramakrishnan | H04N 21/23106 |
| 12,010,493 B1* | 6/2024 | Wong | H04S 7/40 |
| 2002/0065832 A1* | 5/2002 | Mack | G06F 21/10 |
| 2002/0069370 A1* | 6/2002 | Mack | G06F 21/64 726/22 |
| 2004/0039594 A1* | 2/2004 | Narasimhan | H04L 63/102 705/1.1 |
| 2004/0117467 A1* | 6/2004 | Rich | H04L 63/0428 709/223 |
| 2004/0125397 A1* | 7/2004 | Adkins | G06Q 50/06 358/1.14 |
| 2004/0199654 A1* | 10/2004 | Juszkiewicz | H04N 21/6582 709/231 |
| 2005/0097055 A1* | 5/2005 | Kanamori | G06Q 50/184 705/51 |
| 2006/0005029 A1* | 1/2006 | Petrovic | H04N 5/913 713/176 |
| 2006/0012807 A1* | 1/2006 | Bos | G06F 3/1285 358/1.8 |
| 2006/0101269 A1* | 5/2006 | Moskowitz | H04K 1/00 713/176 |
| 2006/0123098 A1* | 6/2006 | Asher | H04L 69/329 709/218 |
| 2006/0190408 A1* | 8/2006 | Cook | G06Q 30/06 705/59 |
| 2006/0212704 A1* | 9/2006 | Kirovski | H04L 9/32 704/E19.009 |
| 2006/0242069 A1* | 10/2006 | Peterka | G06Q 20/00 705/50 |
| 2006/0277151 A1* | 12/2006 | Sankaran | G06F 21/1083 705/59 |
| 2007/0024888 A1* | 2/2007 | Bailey | G06F 3/1238 358/1.14 |
| 2007/0098157 A1* | 5/2007 | Palkar | G06F 21/445 380/37 |
| 2007/0156726 A1* | 7/2007 | Levy | G06F 16/21 |
| 2007/0198363 A1* | 8/2007 | Quoc | G06Q 30/0283 705/26.1 |
| 2007/0198364 A1* | 8/2007 | Quoc | G06Q 30/0601 705/26.1 |
| 2008/0102910 A1* | 5/2008 | Peppel | G06Q 30/02 463/1 |
| 2008/0104714 A1* | 5/2008 | Singer | G06F 21/10 726/30 |
| 2008/0119253 A1* | 5/2008 | Ryan | A63F 13/30 463/13 |
| 2008/0172718 A1* | 7/2008 | Bradley | H04L 63/08 726/1 |
| 2008/0240447 A1* | 10/2008 | Zhu | H04L 9/3271 380/30 |
| 2008/0262968 A1* | 10/2008 | Saxena | G06F 21/10 705/51 |
| 2009/0031431 A1* | 1/2009 | Boccon-Gibod | G11B 20/00739 726/30 |
| 2010/0017885 A1* | 1/2010 | Cohen | H04N 21/440245 705/14.72 |
| 2010/0121941 A1* | 5/2010 | Harrang | G06F 16/24 709/219 |
| 2010/0287609 A1* | 11/2010 | Gonzalez | H04N 21/64322 726/14 |
| 2010/0312810 A1* | 12/2010 | Horton | G06F 21/10 707/812 |
| 2011/0055090 A1* | 3/2011 | Ross | G06Q 50/184 707/758 |
| 2011/0093402 A1* | 4/2011 | Gupta | G06Q 30/018 705/317 |
| 2011/0161086 A1* | 6/2011 | Rodriguez | H04N 19/467 704/E11.001 |
| 2011/0162086 A1* | 6/2011 | Rogel | G06F 21/10 726/28 |
| 2012/0030072 A1* | 2/2012 | Boudreau | G06Q 10/00 705/30 |
| 2012/0066493 A1* | 3/2012 | Widergren | H04L 63/0428 713/160 |
| 2012/0210447 A1* | 8/2012 | Vazquez | H04N 21/25875 726/28 |
| 2013/0057761 A1* | 3/2013 | Bloom | H04N 21/43072 348/E9.034 |
| 2013/0151373 A1* | 6/2013 | Flanagan | G06Q 30/0607 705/26.25 |
| 2013/0152210 A1* | 6/2013 | Petrovic | H04N 1/32144 726/26 |
| 2013/0238468 A1* | 9/2013 | Pangrazio, III | G06Q 30/0601 705/27.1 |
| 2013/0312112 A1* | 11/2013 | Troiano | G06F 21/10 726/27 |
| 2014/0020017 A1* | 1/2014 | Stern | H04N 21/2747 725/34 |
| 2015/0131966 A1* | 5/2015 | Zurek | H04S 3/008 386/241 |
| 2015/0134534 A1* | 5/2015 | Lai | G06Q 50/184 705/59 |
| 2015/0294633 A1* | 10/2015 | Jung | H04L 51/52 345/212 |
| 2015/0373032 A1* | 12/2015 | Stevens | H04M 3/4365 713/176 |
| 2016/0127380 A1* | 5/2016 | Steele | H04L 63/14 726/7 |
| 2016/0180063 A1* | 6/2016 | Bhandaru | G06F 21/105 726/26 |
| 2016/0191853 A1* | 6/2016 | Waisbard | H04N 21/2351 725/31 |
| 2017/0068829 A1* | 3/2017 | Shaw | G06F 21/50 |
| 2018/0084313 A1* | 3/2018 | Splaine | H04N 21/854 |
| 2018/0137179 A1* | 5/2018 | Kawanabe | G06F 16/951 |
| 2018/0158161 A1* | 6/2018 | Yuki | H04M 15/882 |
| 2018/0232503 A1* | 8/2018 | Tsuboi | G06F 21/121 |
| 2018/0253261 A1* | 9/2018 | Kripalani | G06F 3/0604 |
| 2019/0037257 A1* | 1/2019 | Nelson | H04N 21/4126 |
| 2019/0087927 A1* | 3/2019 | Dewitt | G06T 1/0021 |
| 2019/0132652 A1* | 5/2019 | Zhao | H04N 21/8456 |
| 2019/0171731 A1* | 6/2019 | Hanusiak | G06F 16/188 |
| 2019/0295110 A1* | 9/2019 | Bessen | G06N 20/00 |
| 2020/0057841 A1* | 2/2020 | Chowdhury | G06F 21/1078 |
| 2020/0143016 A1* | 5/2020 | Borkar | G06F 21/16 |
| 2020/0365258 A1* | 11/2020 | Langer | G16H 40/20 |
| 2021/0049063 A1* | 2/2021 | Reed | G06F 11/0793 |
| 2021/0117472 A1* | 4/2021 | Guillen | G06F 40/205 |
| 2021/0118423 A1* | 4/2021 | Ping | G10L 19/018 |
| 2021/0219089 A1* | 7/2021 | Sim | H04S 7/306 |
| 2021/0258624 A1* | 8/2021 | Garfinkel | H04N 21/8456 |
| 2021/0326415 A1 | 10/2021 | Lyske | |
| 2021/0336812 A1* | 10/2021 | Kerstan | H04L 12/1831 |
| 2021/0365527 A1* | 11/2021 | Spahr | G06Q 10/02 |
| 2021/0374212 A1* | 12/2021 | Sturm | G06F 21/105 |
| 2022/0046332 A1* | 2/2022 | Singh | H04N 21/6581 |
| 2022/0067415 A1* | 3/2022 | Kerofsky | G06Q 30/0248 |
| 2022/0224872 A1* | 7/2022 | Nagao | G06T 7/73 |
| 2022/0225050 A1* | 7/2022 | Ninan | G06F 3/011 |
| 2022/0278990 A1* | 9/2022 | Li | H04L 63/105 |
| 2022/0310374 A1* | 9/2022 | Lam | H01J 49/027 |
| 2022/0312059 A1* | 9/2022 | Laul | H04N 21/2541 |
| 2022/0353082 A1* | 11/2022 | Busch | H04L 9/3247 |
| 2022/0374503 A1* | 11/2022 | Goldston | G06F 3/0481 |
| 2022/0385730 A1* | 12/2022 | Hua | H04N 21/8355 |
| 2023/0004628 A1* | 1/2023 | Petro | G06F 16/435 |
| 2023/0007350 A1* | 1/2023 | Ly | H04N 21/8586 |
| 2023/0008710 A1* | 1/2023 | Fee | H04N 21/44008 |
| 2023/0009515 A1* | 1/2023 | Agarwal | G06F 16/735 |
| 2023/0058710 A1* | 2/2023 | Montler | G06Q 30/0601 |

(56) References Cited

U.S. PATENT DOCUMENTS

| | | | |
|---|---|---|---|
| 2023/0102646 A1* | 3/2023 | Birkhold | G06T 7/254 |
| | | | 382/128 |
| 2023/0229145 A1* | 7/2023 | Kriegel | G05B 19/4186 |
| | | | 700/306 |
| 2024/0187807 A1* | 6/2024 | Yang | H04S 7/30 |
| 2025/0006208 A1* | 1/2025 | Potter | G06N 3/088 |

* cited by examiner

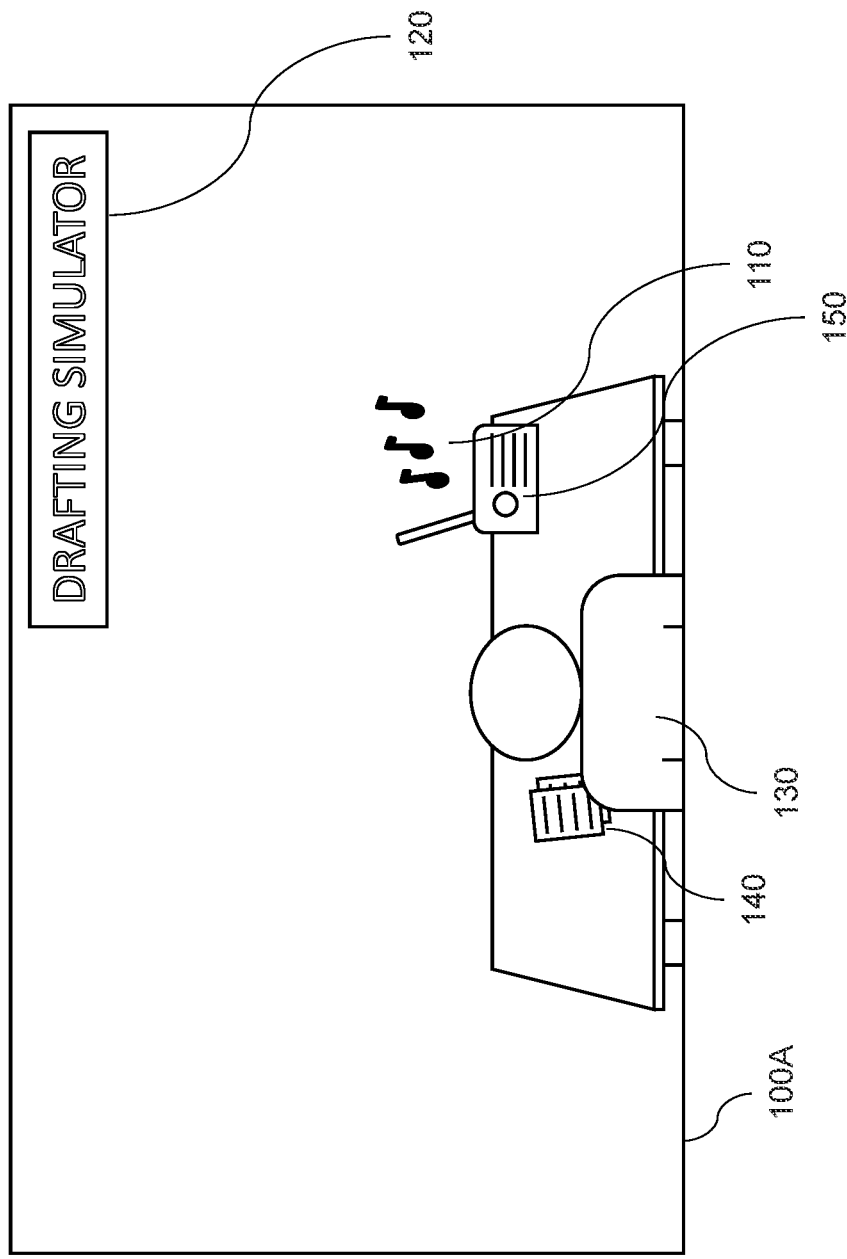

CONTEXTUALIZED CONTENT IDENTIFICATION

CROSS-REFERENCE TO RELATED APPLICATIONS

The present application claims priority from United Kingdom Patent Application No. 2216479.2, filed Nov. 4, 2022, the disclosure of which is hereby incorporated herein by reference.

FIELD OF THE INVENTION

The following disclosure relates to methods for identifying proprietary content which is included within composite media. For example, the disclosure relates to discriminating between licensed usage of a song in recorded video game footage and unlicensed usage of the song in other contexts.

BACKGROUND

Systems such as "Content ID" are used by content owners to automatically monitor for unlicensed usage of their content, which may include sound tracks, images, video clips, etc. In a typical implementation, the system obtains a media file suspected to contain proprietary content, and the system compares the media file to a database of content owned by the content owners, in order to determine whether proprietary content is present. This may then be followed by determining whether the publisher of the media file has an appropriate license to use the proprietary content.

However, existing systems can produce false positive results in which a media file is identified as containing proprietary content without a license. This is especially true when the license includes complex conditions.

For example, sound tracks are frequently licensed for use in video games. As a result, recorded or streamed footage produced by players while playing the video game may contain original visual and sound content for the game and also contain a proprietary sound track. In such scenarios, the player does not generally have a license directly from the content owner of the sound track, but such recorded footage may nevertheless be permitted by a license between the video game provider and the content owner.

In that context, it is desirable to provide an improved way of identifying proprietary content within composite media, while giving reduced false positives.

SUMMARY

According to a first aspect, the present disclosure provides a computer-implemented method for identifying proprietary content in composite media comprising a plurality of media components, the method comprising: identifying a first media component of the composite media as proprietary content; identifying a second media component of the composite media as a context indicator; and determining a context for the proprietary content based on the context indicator.

Herein, composite media may be a media file or collection of media files comprising a plurality of media components. The media file(s) may comprise at least one of video data and audio data. Additionally or alternatively, the media file(s) may comprise other types of media such as haptic feedback data. In the case the composite media relates to video game content, the media file(s) may comprise gameplay data.

Herein, media components are portions of data of the composite media. Different media components may be different types of media, or may be different portions of a same type of media. For example, different media components may be different portions of a single frame of video.

The composite media may further comprise location data associated with one or more of the media components. For example, the location data may be temporal information about when a media component is presented, and/or spatial information about where a media component is presented. In the case of visual data, a spatial location may be for example a location within a frame of video, or a spatial location within a displayed virtual environment. In the case of the composite media relating to video game content, the spatial location may comprise game-related location data relating to information such as game name or ID, level name or ID, character name or ID and player name or ID. In the case of non-visual data, a spatial location may be a location in a virtual environment such as a simulated 3D audio source position.

Optionally, identifying the first media component comprises determining that the first media component matches a media component in a first database of proprietary content. In some examples, identifying the first media component may comprise determining that the first media component matches a media component in a second composite media, for example on storage or stream.

Optionally, the context indicator is a dynamically generated component of the composite media or is a media component with a dynamically defined temporal and/or spatial position. In other words, the composite media cannot straightforwardly be matched against known examples of composite media, whether they be known permitted uses of proprietary content or known disallowed uses of proprietary content. As such the determined context is a dynamic context which exists in some generated composite media but not others, for a given content generation algorithm (e.g. a video game). For example, the dynamic composite media output by a content generation algorithm may depend upon a variety of inputs to the algorithm, such as random inputs, user inputs, and the time at which content is generated. In particular, the dynamic context may depend upon how a user chooses to play a video game (e.g. what part of a level they visit, what enemy they are fighting). Furthermore, the dynamic context may depend upon how a user has previously chosen to play a game (e.g. a time series of user behaviour). This can be contrasted with a static context which may occur, for example, in recordings of an officially-produced sound track or a film, wherein the relationships between different media components (e.g. different sound track parts, different visual scenes, characters and so on) are fixed, such that a predictable signature can be used to identify copies of the recording or part of the recording.

Optionally, the composite media is media generated at least in part by a real-time user-interactive process. For example, the real-time user-interactive process may be a video game.

Optionally, identifying the second media component comprises determining that the second media component matches a second database of content indicators.

As a further option, the method may comprise obtaining the second database of content indicators based on the proprietary content. In other words, the second database is obtained after identifying a first media component as proprietary content. This means that the second database can be made smaller and more relevant so that the context can be determined more efficiently.

Optionally, determining the context for the proprietary content based on the context indicator comprises determining a spatial position of the first media component and a spatial position of the second media component. This means that the context for usage of proprietary content can be determined and controlled more precisely.

Optionally, the context comprises a temporal and/or spatial offset between the first media component and the second media component. By using offsets, the context can be determined independently of other factors such as when and/or where the second media component appears in the overall composite media.

Optionally, the method further comprises determining whether the context is a permitted context for the proprietary content. This may comprise determining whether the context matches a third database of permitted contexts.

As a further option, the context comprises an evolving offset between the first media component and second media component over time, and determining whether the context is a permitted context comprises comparing the evolving offset to a permitted content generation algorithm. For example, where content is dynamically generated, the method may check that the proprietary content is being used in the context of an approved algorithm.

According to a second aspect, the present disclosure provides a computer-implemented method for processing composite media comprising a plurality of media components to remove proprietary content. The method comprises: performing a method according to the first aspect; and processing the composite media to remove or modify the first media component. In this way, use of proprietary content can be monitored and controlled without inhibiting the distribution of the composite media.

According to a third aspect, the present disclosure provides a computer program comprising instructions which, when the program is executed by a computer, cause the computer to carry out the method of the first or second aspect.

According to a fourth aspect, the present disclosure provides a computer-readable medium comprising instructions which, when executed by a computer, cause the computer to carry out the method of the first or second aspect.

According to a fifth aspect, the present disclosure provides a data processing apparatus configured to perform the method of the first or second aspect. The apparatus may comprise general-purpose computer hardware that is used to execute a program according to the third aspect. Additionally or alternatively, the apparatus may comprise specialised hardware (such as an ASIC) which is specifically adapted to perform at least part of the method of the first or second aspect. The apparatus may be a distributed apparatus comprising multiple connected apparatuses. For example, the apparatus may be implemented in a cloud infrastructure. An apparatus according to the fifth aspect may form part of a content distribution system.

BRIEF DESCRIPTION OF THE DRAWINGS

FIGS. 1A and 1B schematically illustrate examples of composite media;

DETAILED DESCRIPTION

Figure 1B:
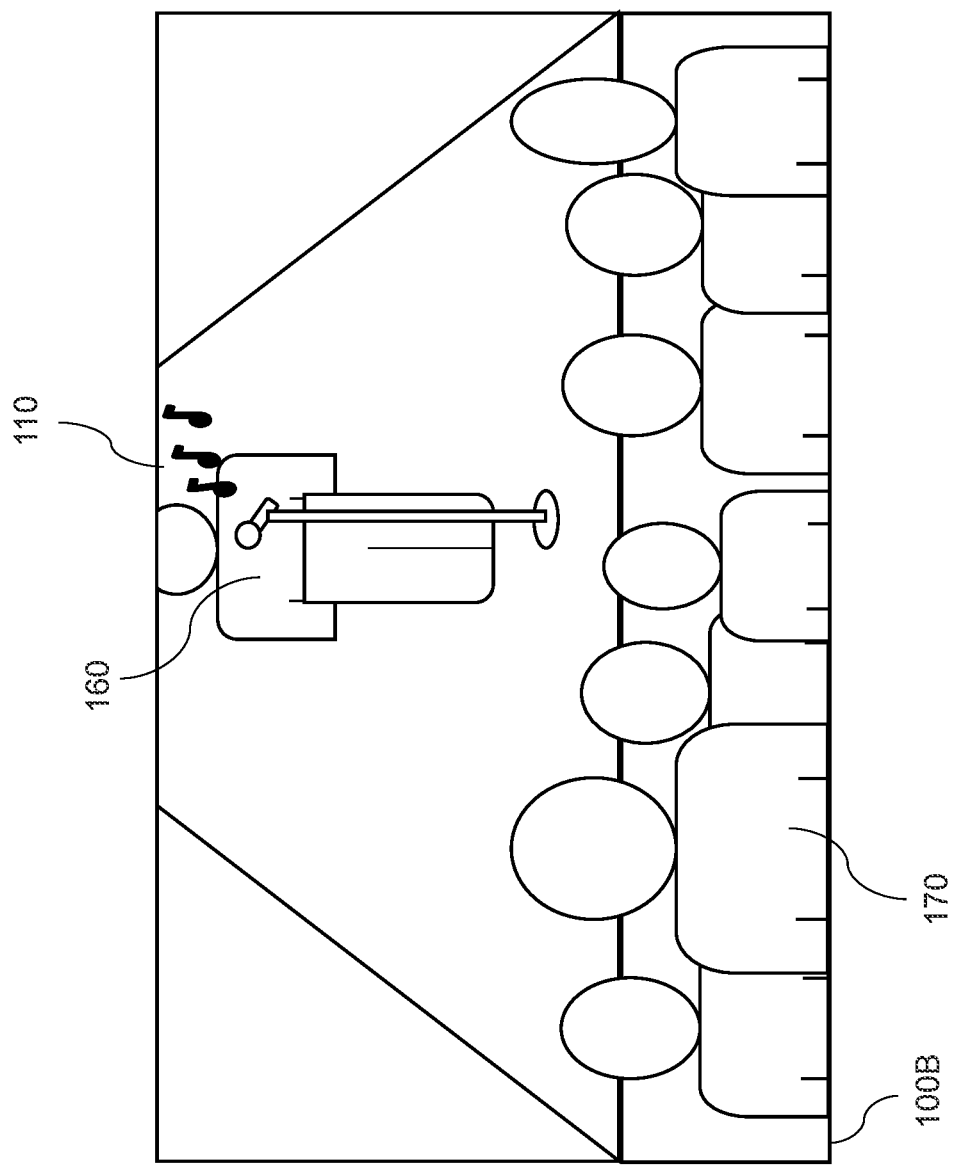

FIGS. 1A and 1B schematically illustrate examples of composite media.

Referring to FIG. 1A, a first example of composite media 100A is an audiovisual media file recorded or streamed from a dynamic content-generation program (such as a real-time user-interactive video game). This may be an example of a permitted use of proprietary content.

The composite media 100A comprises a target media component 110. The target media component 100 may be identified as proprietary content. In this example the target media component is an audio component such as a song.

The composite media 100A also includes one or more further media components 120, 130, 140, 150 which can be used to identify a context of the target media component 110. In this case, the further media components are visual components. In other examples there may be other types of further media components such as audio and/or haptic feedback.

The further media components may include a static component. This may be, for example, an identifier 120 identifying the source (e.g. program) which produced the composite media. In other examples, such a direct identifier may be more directly indicated in metadata of the composite media without using visual data.

The further media components also include a dynamically generated component. This may for example be a regular interface feature 130. The regular interface feature in this example is a third person view of a player character in a video game. Another example of a regular interface feature would be an element of a heads-up-display providing information about a state of the program or a state of the user within the program. Any regular interface feature may be used to characterize the program, such that the regular interface feature indicates that the context for the target media component 110 is a display output of the dynamic content-generation program.

Another dynamically generated component of the composite media may be an irregular interface feature 140. The irregular interface feature may be used to identify a specific scenario which may occur in the display output of the dynamic content-generation program. For example, the irregular interface feature may identify a specific current environment and/or task which the user is experiencing in a video game (e.g. a specific location they are visiting in a virtual environment, or a specific enemy they are fighting). The irregular interface feature may be used to aid in identifying the target media content 110.

The visual components also include a linked component 150 which is linked to the target media component 110. In this example, the linked component 150 visually represents the source of the audio component 110. More specifically, the linked component 150 appears in FIG. 1A as a radio. The linked component 150 may have a fixed relationship to the target media component 110. For example, the target media component 110 may only be presented (e.g. visible or audible) when the linked component 150 is also presented. Alternatively, the way in which the target media component 110 is presented (e.g. a simulated 3D source of an audio component 110) may depend on a location (e.g. spatial position) of the linked component 150.

Each of the further media components 120, 130, 140, 150 may have a dynamic relationship to the target media component 110. For example, the relationship may comprise an evolving offset between the target media component and the further media component over time. More specifically, a spatial or temporal offset between the target media component and the further media component may vary with time according to an algorithm.

The above is of course a simplification, and composite media may typically comprise a complex combination of many audio components, many visual components, as well as components of other media types. For example, audio in a video game typically comprises at least one of background music, dialogue, environmental sounds, and action sound effects. Background music may itself be algorithmically (or otherwise) generated by combining different audio portions (stems) in different combinations while also varying factors such as amplitude and speed. Various techniques for sound source separation are known for isolating individual audio components. Once isolated, each individual audio component can be assessed.

Referring to FIG. 1B, a second example of composite media 100B is another audiovisual media file recorded using the camera of a mobile phone. This may be an example of a disallowed use of proprietary content.

The composite media 100B comprises the same target media component 110 as in the first example. However, the context for the target media component 110 is different.

More specifically, instead of further media components 120, 130, 140, 150, the composite media 100B comprises further media components 160 and 170.

The further media components 160 and 170 may have similar logical purposes to the further media components of composite media 100A, such as a source identifier, an interface feature, or a feature linked to the target media component 110. Alternatively, the further media components 160 and 170 may simply be portions of media data (e.g. audio data, visual data).

However, the further media components 160 and 170 can be distinguished from the further media components 120 to 150 on the basis of any of: the data (e.g. visual data, audio data) of the further media component; an absolute location of the further media component within the composite media 100B; a location of the further media component relative to the target media component 110; how the relative location changes over time, and so on.

Figure 2:
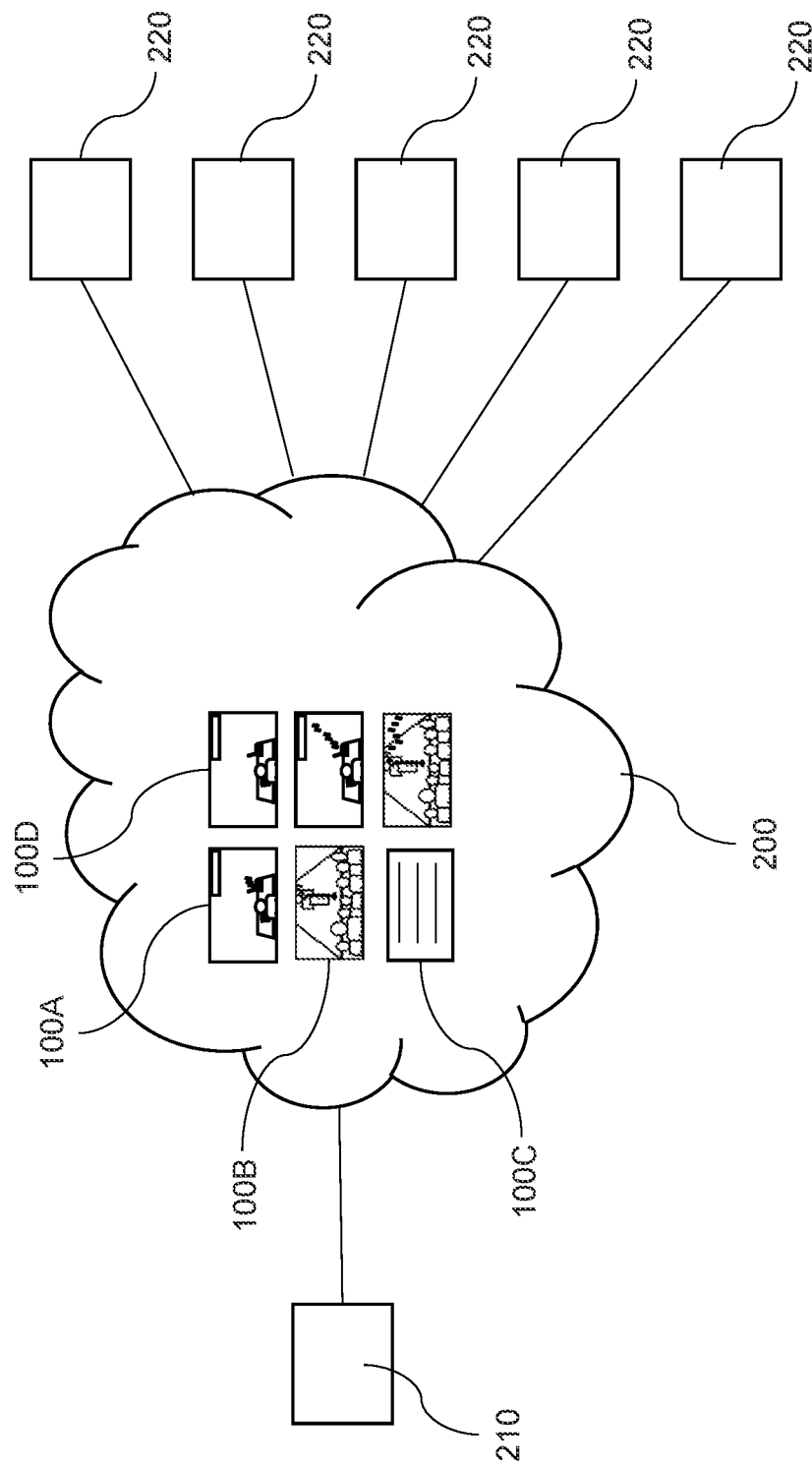
FIG. 2 schematically illustrates a content distribution system.

FIG. 2 schematically illustrates a content distribution system as an example of a system in which or for which the invention may usefully be implemented.

The content distribution system comprises a core 200 and a plurality of terminals 210, 220.

The core 200 may for example be a server-based or cloud-based platform connected to the internet or another network. The core 200 stores a plurality of composite media 100A, 100B, 100C, 100D ready for distribution to users for consumption (e.g. viewing a video, listing to a song, reading an article, playing a game).

Each of the terminals may be used as an upload terminal 210 for uploading composite media to the core 200 and/or a download terminal 220 for obtaining composite media from the core 200.

The composite media stored in the core 200 may include variants of similar composite media. For example, in the illustrated example, composite media 100D is the same as composite media 100A but without the target media component 110.

Figure 3:
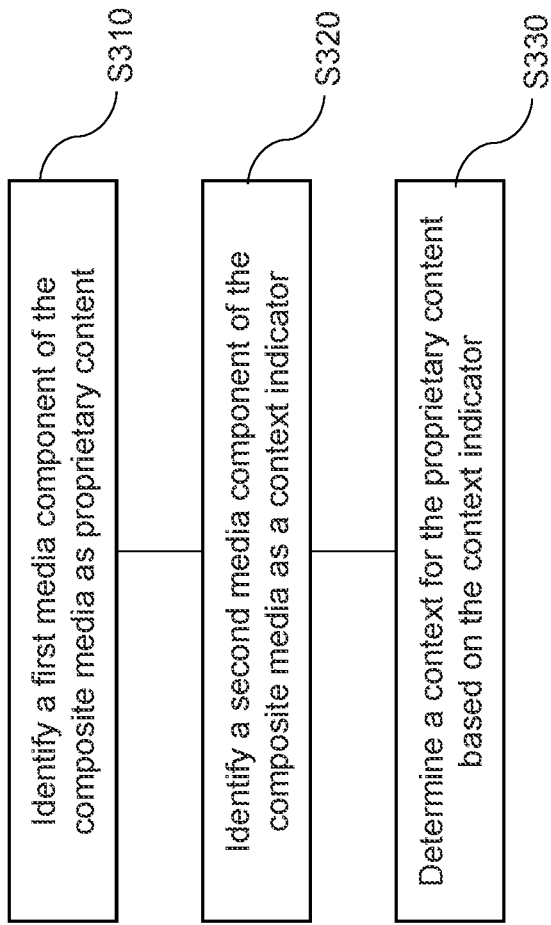
FIG. 3 schematically illustrates a method according to the invention.

FIG. 3 schematically illustrates a method according to the invention for identifying proprietary content in composite media. This method may, for example, be applied to each composite media stored in the core 200 or may be applied each time composite media is uploaded from terminal 210 or each time composite media is downloaded to terminal 220. The method may even be performed in a "live" manner while composite media is being streamed from the terminal 210 or streamed to the terminal 220. More generally the method may be performed by any localized or distributed computer which has access to composite media.

Figure 4:
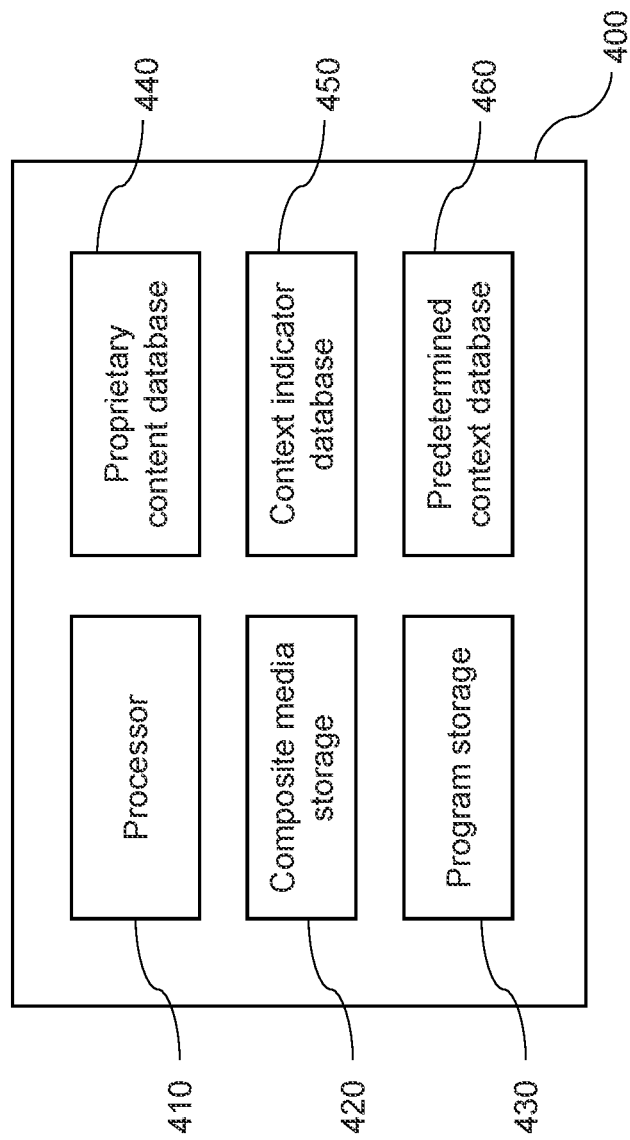
FIG. 4 schematically illustrates an apparatus according to the invention.

For example, the method may be performed by an apparatus 400 as schematically illustrated in FIG. 4. The apparatus comprises one or more processors 410, one or more memory portions 420 for storing composite media, one or more memory portions 430 for storing program instructions which, when executed by the processor 410, cause the processor(s) to perform the following method, and optionally one or more databases 440, 450, 460.

At step S310, a first media component of the composite media is identified as proprietary content. This may be implemented by matching data of the first media component to data of a known example of proprietary content. For example, the known example of proprietary content may be an entry in a proprietary content database 440. Additionally or alternatively, the composite media may itself contain metadata identifying the first media component as proprietary content.

At step S320, a second media component of the composite media is identified as a context indicator. Any media component may be used as a context indicator. However, the context indicator is most useful if it is a previously known context indicator. A known context indicator may be identified in the composite media by matching data of the second media component to data of a previously known context indicator.

The known context indicator may for example be an entry in a context indicator database 450. The context indicator database 450 may be a fixed database regardless of the first media component which is identified in step S310. Alternatively, the method may comprise a step S315 (not shown) between steps S310 and S320. At step S315, the context indicator database 450 is obtained based on the proprietary content. For example, a general context indicator database may be filtered to only include context indicators which are potentially relevant to the first media component. For example, the obtained context indicator database may comprise only context indicators which are associated with the first media component in a predetermined context. This may save time when identifying the second media component as a context indicator.

Alternatively, when comparing first composite media comprising proprietary content to second composite media comprising the proprietary content, any arbitrary media component may be used as a context indicator. This may reduce the preparatory work in order to define a permitted context. Additionally or alternatively, the context indicator may be identified by metadata contained in the composite media.

At step S330, a context for the proprietary content is determined based on the context indicator. In the simplest case, the context may simply be in the form of "proprietary content X is used in composite media comprising context indicator Y". However, the context is preferably identified more specifically.

In one example, a location of the first media component in the composite media and a location of the second media component in the composite media may be included in the context. These may be absolute and/or relative locations, and may be spatial and/or temporal locations. For example, in the example of a video game, a sound effect or song (proprietary content) may be played at times when a particular character is displayed, or at times when the particular character is at a specific location in the display.

At a further step S340 (not shown), the method may comprise determining whether the context is a permitted context for the proprietary content. Step 340 may be implemented by comparing the context determined in step S330 to a predetermined context. The predetermined context may be an entry in a database of whitelisted contexts. If the determined context matches the whitelist, then it is determined that the context is permitted. Alternatively, the predetermined context may be an entry in a database of blacklisted contexts. If the determined context matches the blacklist, then it is determined that the context is not permitted. The predetermined context may be a precise context or may be given a "fuzzy" definition defining a range of possible contexts which may be matched to the determined context. Furthermore, as mentioned above, the context of a media component may vary dynamically. In the same way, the predetermined context may be given a dynamic definition, for example by defining a content generation algorithm. The predetermined context may be an entry in a predetermined context database 460.

After step S340, the method may comprise a yet further step S350 (not shown). At step S350, the composite media is modified based on the determination is step S340.

In the case of determining that the proprietary content is used in a permitted context, step S350 may comprise adding metadata to the composite media verifying that the composite media has been checked and verified. This may be used to control subsequent actions such as enabling monetization of the composite media.

On the other hand, in the case of determining that the proprietary content is used in a disallowed context, step S350 may comprise removing the first media component from the composite media (e.g. muting the offending audio), reducing the noticeability of the first media component in the composite media (e.g. reducing volume of an audio component or increasing transparency of a visual component), and/or adding metadata to the composite media indicating that the composite media has been checked and has failed the test. The reducing or removing of a media component may be applied in real-time in a "live" stream context. A determination that the proprietary content is used in disallowed content may be used to control subsequent actions such as suspending distribution of the composite media.

In the above examples, context for an audio component such as a song was determined using one or more visual components as context identifiers. However, the invention is not restricted to particular media types.

For example, the invention may be used to determine context for a visual component such as an artwork or a clip from a TV show.

Furthermore, the invention may be used to determine context of one audio component among an arrangement of different audio components. For example, this may be used to verify that a backing track is used together with the intended lyrics.

Additionally, a mixture of different media type components can be used as simultaneous context identifiers. For example, a particular arrangement of audio components may be expected together in one scene of a video game, but not expected elsewhere in footage of the video game. In that example, the context for one audio component comprises one or more further audio components and one or more visual components.

Furthermore, context identifiers may be given hierarchical definitions, such that certain secondary context identifiers are only considered if a corresponding primary context identifier has been identified in the composite media.

The invention can also be applied in contexts where it is not necessary to consider whether or not a media component is "proprietary". For example, the invention can be used to identify or verify the source of a composite media stream/recording.

In one example, a dynamic content-generation program (such as a video game) may have rules for the context(s) in which a media component (such as a song) is dynamically presented. For example, the media component may be presented as a user progresses through different levels, environments etc.

In order to identify or verify that composite media was generated from the program, a computer-implemented method may be performed, the method comprising: identifying a first media component of the composite media; identifying a second media component of the composite media as a context indicator; and determining a context for the first media component based on the context indicator; and identifying or verifying that a predetermined context (associated with the dynamic content-generation program) is consistent with the determined context. The predetermined context may for example be a predetermined context which is known to be present in the dynamic content-generation program.

Such verification of the origin of composite media can also be performed even if none of the media components of the composite media are proprietary content. Nevertheless, many of the above described features of a method for identifying proprietary content in composite media may be also be used in the method for identifying or verifying that composite media was generated in a predetermined context (e.g. a predetermined program).

For example, identifying the first media component may comprise determining that the first media component matches a media component in a first database of known media components.

As another example, the context indicator may be a dynamically generated component of the composite media or a media component with a dynamically defined temporal and/or spatial position.

As another example, the composite media may be media generated at least in part by a real-time user-interactive process.

As another example, the real-time user-interactive process may be a video game. As another example, identifying the second media component may comprise determining that the second media component matches a second database of content indicators.

As another example, the method for identifying or verifying that composite media was generated in a predetermined context may further comprise obtaining the second database of content indicators based on the proprietary content.

As a further example, determining the context for the first media component based on the context indicator may comprise determining a spatial position of the first media component and a spatial position of the second media component.

As a further example, the context may comprise a temporal and/or spatial offset between the first media component and the second media component.

As a further example, the context may comprise an evolving offset between the first media component and second media component over time, and identifying or verifying that a predetermined context (associated with the dynamic content-generation program) is consistent with the determined context may comprise comparing the evolving offset to a predetermined evolving offset.

The invention claimed is:

1. A computer-implemented method for identifying proprietary content in composite media comprising a plurality of media components, the method comprising:
   identifying a first media component of the composite media as proprietary content;
   identifying a second media component of the composite media as a context indicator;
   determining a context for the identified proprietary content based on the identified context indicator, the context for the identified proprietary content indicating how the identified proprietary content is used within the composite media;
   determining whether the context for the identified proprietary content is a permitted context for the proprietary content; and
   modifying the composite media based on whether the context for the identified proprietary content is determined to be a permitted context for the proprietary content.

2. The method according to claim 1, wherein identifying the first media component comprises determining that the first media component matches a media component in a first database of proprietary content.

3. The method according to claim 1, wherein the context indicator is a dynamically generated component of the composite media or is a media component with at least one of a dynamically defined temporal or spatial position.

4. The method according to claim 1, wherein the composite media is media generated at least in part by a real-time user-interactive process.

5. The method according to claim 4, wherein the real-time user-interactive process is a video game.

6. The method according to claim 1, wherein identifying the second media component comprises determining that the second media component matches a second database of context indicators.

7. The method according to claim 6, further comprising obtaining the second database of context indicators based on the proprietary content.

8. The method according to claim 1, wherein determining the context for the proprietary content based on the context indicator comprises determining a spatial position of the first media component and a spatial position of the second media component.

9. The method according to claim 1, wherein the context comprises at least one of a temporal or spatial offset between the first media component and the second media component.

10. The method according to claim 1, wherein determining whether the context for the identified proprietary content is a permitted context comprises determining whether the context for the identified proprietary content matches a third database of permitted contexts.

11. The method according to claim 1, wherein the context for the identified proprietary content comprises an evolving offset between the first media component and second media component over time, and determining whether the context for the identified proprietary content is a permitted context comprises comparing the evolving offset to a permitted content generation algorithm.

12. The method according to claim 1, further comprising:
   determining that the context for the identified proprietary content is a permitted context for the proprietary content; and
   adding metadata to the composite media indicating that the composite media has been verified.

13. The method according to claim 1, further comprising:
   determining that the context for the identified proprietary content is not a permitted context for the proprietary content; and
   performing at least one of:
      removing the first media component from the composite media;
      reducing a noticeability of the first media component in the composite media; or
      adding metadata to the composite media indicating that the composite media failed verification.

14. One or more non-transitory computer storage media encoded with computer program instructions that when executed by one or more computers cause the one or more computers to perform operations comprising:
   identifying a first media component of the composite media as proprietary content;
   identifying a second media component of the composite media as a context indicator;
   determining a context for the identified proprietary content based on the identified context indicator, the context for the identified proprietary content indicating how the identified proprietary content is used within the composite media;
   determining whether the context for the identified proprietary content is a permitted context for the proprietary content; and
   modifying the composite media based on whether the context for the identified proprietary content is determined to be a permitted context for the proprietary content.

15. A system comprising:
   one or more computers and one or more storage devices on which are stored instructions that are operable, when executed by the one or more computers, to cause the one or more computers to perform operations comprising:
   identifying a first media component of the composite media as proprietary content;
   identifying a second media component of the composite media as a context indicator;
   determining a context for the identified proprietary content based on the identified context indicator, the context for the identified proprietary content indicating how the identified proprietary content is used within the composite media;
   determining whether the context for the identified proprietary content is a permitted context for the proprietary content; and
   modifying the composite media based on whether the context for the identified proprietary content is determined to be a permitted context for the proprietary content.

* * * * *